Nov. 3, 1964  W. C. PATTERSON  3,155,247
SELF-CENTERING AUGER APPARATUS
Filed Aug. 13, 1962
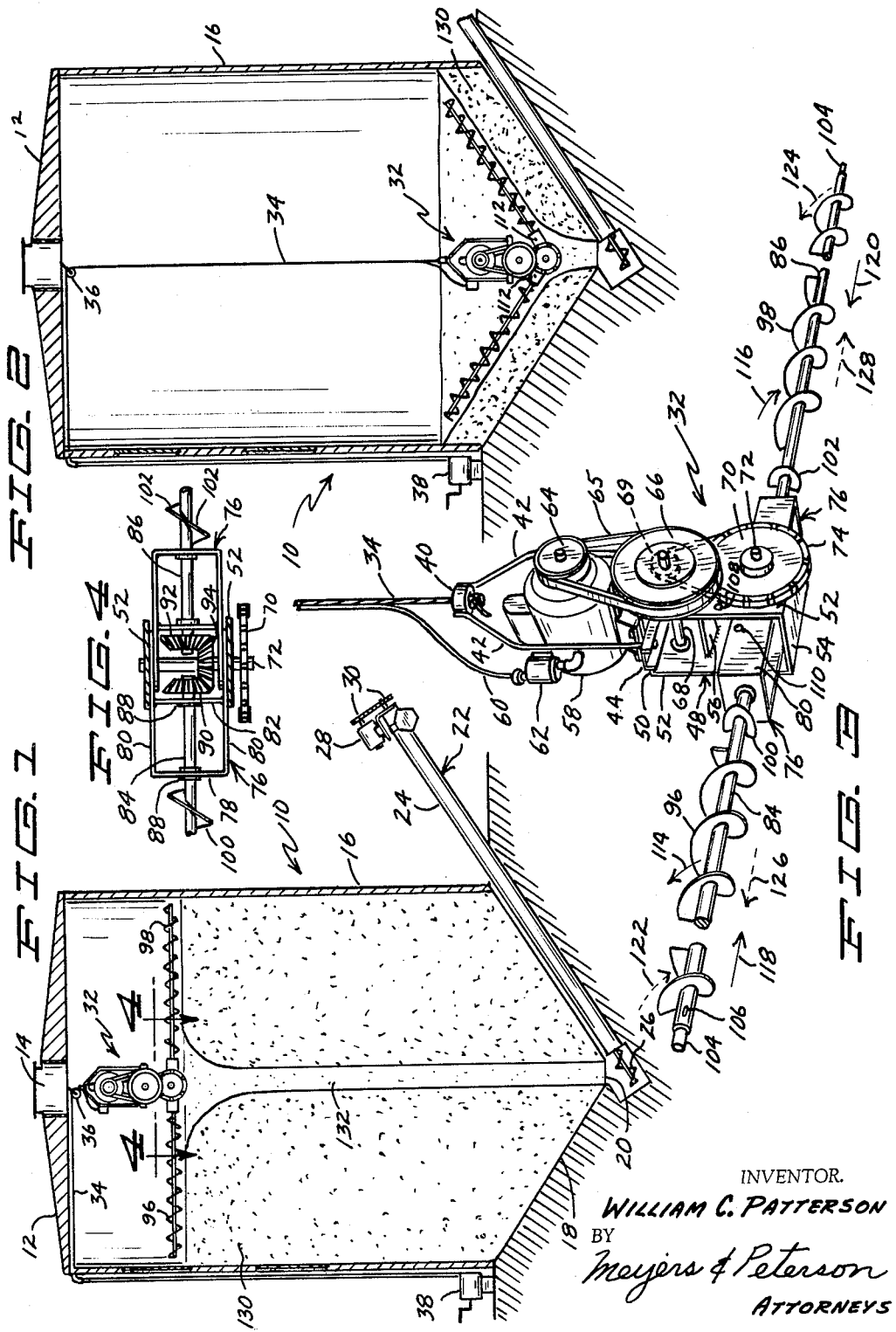
INVENTOR.
WILLIAM C. PATTERSON
BY
Meyers & Peterson
ATTORNEYS 3,155,247
SELF-CENTERING AUGER APPARATUS
William C. Patterson, Omaha, Nebr., assignor to Nebraska Engineering Company, Omaha, Nebr., a corporation of Nebraska
Filed Aug. 13, 1962, Ser. No. 216,510
5 Claims. (Cl. 214—17)

This invention relates generally to silos and bins, and pertains more particularly to auger apparatus for use therein in loading or unloading the silo or bin.

One object of the invention is to provide auger apparatus for silos or bins which will automatically center itself. More specifically, the invention has for an aim the use of two auger or screw members that work against each other, thereby neutralizing the thrust that would otherwise push a single auger against the side wall of the particular storage receptacle in which the auger apparatus is employed.

Another object is to provide auger apparatus that will automatically advance or propel itself via a crawling action around the interior of the silo so as to constantly engage new feed, thereby distributing the feed uniformly when loading the silo and also removing the feed uniformly when unloading the silo.

Still further, the invention has for another object the provision of auger apparatus that will clear out the tapered hopper at the bottom of a silo or bin, means being provided for adjustment of the individual augers into an inclined relationship corresponding to the particular slope or taper that has been imparted to the hopper portion of the silo or bin.

Also, the invention has for an object the provision of means for preventing the drive mechanism from jamming when moving feed inwardly in a radial direction.

Yet another object is to provide auger apparatus that is simple, inexpensive, virtually trouble-free, and which will effectively eliminate sealed bins or silos due to caking and freezing.

These and other objects and advantages of my invention will more fully appear from the following description, made in connection with the accompanying drawing, wherein like reference characters refer to the same or similar parts throughout the several views and in which:

FIGURE 1 is a side elevational view of a silo bin, somewhat schematically portrayed, in which my auger apparatus has been installed;

FIGURE 2 is a view corresponding to FIGURE 1 but with the two augers arranged at an angle so as to clean out the tapered hopper at the bottom of the silo or bin;

FIGURE 3 is a perspective view of my auger apparatus as it appears in FIGURE 1, a portion of each oppositely directed auger being removed so that the apparatus can be pictured in a limited amount of space; and FIGURE 4 is a view taken in the direction of line 4—4 in FIGURE 1 for the purpose of showing to better advantage the particular gear means for driving each of the two oppositely directed augers.

Referring now in detail to the drawing, a typical silo or bin has been denoted generally by the reference numeral 10. As can well be understood, such structures vary widely as to their design. However, in the present instance, the silo or bin 10 is provided with a top 12 having a centrally disposed filler opening 14, although the opening 14 in many situations would be at one side. Also included in the silo or bin 10 is a cylindrical side wall 16 having a tapered hopper portion 18 at the bottom for the convenience of removing the material from the silo or bin via a discharge opening 20. Appropriate means for removing the feed from the discharge opening 20 is provided, and for the sake of illustration, this has been shown as constituting discharge auger apparatus 22 having a casing 24, an auger or screw member 26, a drive motor 28 and gears 30 for transmitting the drive motion from the motor 28 to the screw member 26.

The above-described details do not play an important role in the practicing of the invention, for they should be considered as conventional. However, the invention itself is concerned with auger apparatus generally designated by the reference numeral 32. This apparatus 32 is suspended within the silo or bin 10 through the agency of a flexible cable 34 trained over a pulley or sheave 36 at the top 12. The cable 34 extends radially outwardly and then downwardly to a winch 38 for the purpose of raising and lowering the auger apparatus 32 within the silo or bin 10.

Describing the apparatus 32 in detail and with especial reference to FIGURES 3 and 4, it is to be noted that a ring member 40 is provided to which the cable 34 is attached. Extending downwardly from opposite portions of the ring member 40 are rods 42 which have a support channel 44 attached to their lower ends. The channel 44 supports a rectangular frame member 48 having a top panel 50, downwardly extending side panels 52, a bottom panel 54 and a center brace or strut 56. A drive motor 58 is mounted on the top panel 50 and receives electric power via an electric cable 60 leading downwardly to a box 62 containing a rotating electric contact therein. The drive motor 58 is equipped with a pulley 64. A pulley 66 is mounted on a transverse jack shaft 68 which is journaled for rotation in the parallel top panels 50, a flexible belt 65 extending about both pulleys 64, 66. Lying behind the jack shaft pulley 66, there is a sprocket 69 on the shaft 68. Also included in the apparatus is a driven sprocket 70 on a shaft 72, a chain 74 passing about the driven sprocket 70 and also about the concealed drive sprocket mounted on the shaft 68.

Continuing with the description of the auger apparatus 32, attention is now drawn to the presence of two generally U-shaped members 76, each having a closed end 78, parallel sides 80 which are pivotally mounted on the previously-mentioned shaft 72, and a transverse plate 82. The closed end 78 and the transverse plate 82 of each member 76 serve as a support for a pair of oppositely directed shafts 84, 86, the adjacent ends of these shafts being journaled in bearings 88 that are carried by the closed ends 78 and the transverse plates 82. The shaft 84 has keyed thereto a bevel gear 90, and in a similar manner, the shaft 86 has mounted thereon a bevel gear 92. These two bevel gears 90, 92 are in mesh with a bevel gear 94 on the shaft 72.

When viewed in an outward radial direction from a central point, the shafts 84, 86 can be considered to have helical flights 96 and 98, respectively, which are of a right hand character. These helical flights 96 and 98, together with the shafts 84 and 86, constitute the screw members or augers that perform the feed-shifting operation that will be referred to more specifically hereinafter. However, at this time, it should be observed that the shafts 84, 86 are also provided with left hand auger blades or vanes 100 and 102, respectively, which prevent the centrally located drive mechanism from becoming jammed with feed when the feed is being moved radially inwardly by the screw members. For the purpose of protecting the side wall 16, it is preferred that each shaft 84, 86 have attached to its free end a rubber bumper member 104. When the shafts 84, 86 are of a tubular construction, then all that is needed is a set screw 106 for retaining the rubber bumper 104 in place.

One of the features of the present invention is the removal or cleaning out of substantially all of the feed contained in a silo or bin, and inasmuch as these structures usually are provided with tapered hoppers at the lower end thereof, it is within the contemplation of the invention to angularly adjust the screw members or augers so that they are inclined at substantially the same angle as the bottom slope of the particular silo or bin. To accomplish this objective, at least one side 52 of the rectangular frame 48 is provided with a pair of apertures 108, one of which is visible in FIGURE 3. An aperture 110 is provided in one side 80 of each member 76 so as to be registrable with its companion aperture 108 when the augers or screw members are tilted into the position in which they appear in FIGURE 2. The augers or screw members are retained in their inclined relationship by means of a pair of pins 112 that extend through the apertures 108 and 110 when in registry with each other.

Although the operation presently to be presented is extremely simple, it may be of assistance in appreciating the benefits to be derived from a practicing of the invention to indicate what occurs when the shafts 84 and 86 are rotated in either of their two directions. Accordingly, solid arrows 114, 116 have been applied to the shafts 84 and 86, respectively. When the shafts are rotated in this particular direction, the helical flights 96 and 98 cause feed to be moved in the direction of the solid radially oriented arrows 118, 120. On the other hand, when the shafts 84 and 86 are rotated in an opposite direction, as indicated by the dotted arrows 122 and 124, then the movement of the feed is in the direction of the dotted arrows 126 and 128.

It will be assumed for the sake of discussion that feed contained in the silo or bin 10 is of a granular nature, such as corn 130. Thus, when using my apparatus 32, the winch 38 would pay out its cable 34 to lower the apparatus toward the bottom of the silo or bin. During the filling operation, a torpedo member would be suspended from the rectangular frame 48 so as to provide a centrally disposed flue 132. Torpedo members of this type are quite widely used, so it has not been considered necessary to illustrate the actual filling operation with such a member. However, the grain is introduced into the silo or bin 10 through the filling opening 14, which as already indicated, need not be located at the center of the top 12. As the silo or bin 10 is filled, the winch 38 would gradually raise the apparatus 32 while the shafts 84, 86 are being rotated by the drive motor 58. The drive motor 58 should be capable of being operated in either direction, and when filling the silo or bin 10, then the motor 58 would be energized so as to cause rotation of the shafts 84, 86 in the direction indicated by the dotted arrows 122 and 124. This has the effect of constantly moving the grain or feed radially outwardly in the direction of the dotted arrows 126, 128. Thus, as the apparatus 32 is raised, it causes the grain to be distributed in a uniform manner by reason of the particular rotation of the shafts 84, 86 that has just been described.

As is the situation with both loading and unloading, the silo or bin 10, the reaction caused by the movement of the helical flights 96, 98 is substantially neutralized owing to the fact that two such flights are utilized and work against each other. Hence, although the rubber bumper members 104 are provided, there is no appreciable thrust against the cylindrical side wall 16 and thus no circumferential track need be employed which must of necessity be raised and lowered in unison with a single type auger apparatus that has been used in the past.

It will also be appreciated that by reason of the virtually free suspension of the apparatus 32 at the lower end of the cable 34, the apparatus can rotate quite readily. Consequently, the helical flights 96, 98 provide a crawling or propelling action that angularly advances the augers or screw members so that new feed is constantly encountered. In this way, both during filling and emptying the silo or bin 10, the feed will be either uniformly added or will be uniformly withdrawn.

Having described fairly comprehensively the manner in which the silo or bin 10 is filled with my auger apparatus 32, the way in which the silo or bin is unloaded should be manifest. The direction of the drive motor 58 is reversed from that described above so that the shafts 84, 86 rotate in the direction indicated by the solid arrows 114 and 116. This has the effect of moving the grain 130 radially inwardly toward the flue 132 as denoted by the solid arrows 118 and 120. The feed thus falls down through the flue 132 where it is removed by reason of the discharge auger apparatus 22. Here again, because the apparatus 32 is constantly being rotated about the vertical axis provided by the cable 34, it follows that any feed that has been caked or frozen will be dislodged and moved toward the centrally disposed flue 132.

When the unloading procedure has advanced toward the lower edge of the cylindrical side wall 16, the augers comprised of the flights 96, 98 and the shafts 84 and 86 on which these flights are affixed can be inclined into the position depicted in FIGURE 2. All that the operator need do is to align the apertures 108 and 110 so that the pin 112 can be inserted in each instance. This causes the shafts 84 and 86 to be retained at the appropriate angle so that the helical flights 96 and 98 operate in a path substantially parallel to the tapered hopper bottom denoted by the reference numeral 18.

It will, of course, be understood that various changes may be made in the form, details, arrangements and proportions of the parts without departing from the scope of my invention as set forth in the appended claims.

What is claimed:

1. Self-centering auger apparatus for silos comprising:
   (a) a flexible cable;
   (b) means suspending said cable within a silo;
   (c) a U-shaped support member attached to the lower end of said cable;
   (d) a drive shaft extending between the sides of said support member;
   (e) a pair of additional U-shaped members pivotally mounted at one end on said shaft to thereby journal said shaft in the sides thereof and projecting in generally opposite directions;
   (f) a pair of oppositely directed screw members journaled at one end in the ends of said additional U-shaped members;
   (g) a bevel gear on the adjacent end of each screw member; and
   (h) a bevel gear on said drive shaft in mesh with said first-mentioned bevel gears for rotating said shafts in the same rotative directions when viewed outwardly from a central point to auger feed radially inwardly or outwardly in accordance with the direction in which said drive shaft is rotated.

2. Self-centering auger apparatus in accordance with claim 1 including:
   (a) a pair of apertures in said U-shaped support member;
   (b) an aperture in each additional U-shaped member each registrable with one of said pair of apertures; and
   (c) a pair of pins insertable in said apertures when in registry for retaining said screw members in an inclined relationship.

3. Self-centering auger apparatus for silos comprising:
   (a) first, second and third means;
   (b) means suspending said first means within a silo for rotation about a vertical axis;
   (c) a horizontal shaft journaled in said first, second and third means to permit pivotal movement of said second and third means on said shaft in vertical planes relative to said first means, said second and third means extending in generally opposite directions;

(d) a pair of screw members journaled for rotation at their adjacent ends on said second and third means, respectively, so as to extend in generally opposite directions;

(e) motor means carried on said first means for causing rotation of said horizontal shaft;

(f) a first bevel gear fixedly mounted on said horizontal shaft for rotation therewith; and (g) an additional bevel gear fixedly mounted on each of said screw members at their said adjacent ends in a meshed relation with said first bevel gear so as to be driven thereby and thus cause rotation of said screw members in the same rotative direction when viewed from a central point between said adjacent ends, (h) said screw members having helical flights with each flight progressing in a direction so as to move feed radially in the same relative direction when said shaft is rotated by said motor means.

4. Self-centering means in accordance with claim 3 including:

(a) respective means interengaging said first and second means and said first and third means for maintaining said second and third means at a desired angle relative to said first means and thus said screw members at a preferred inclination relative to said first means.

5. Self-centering means in accordance with claim 4 in which:

(a) said motor means includes an electric motor carried atop said first means provided with a second shaft extending parallel to said first shaft; and (b) flexible drive means interconnecting said shafts.

References Cited in the file of this patent

UNITED STATES PATENTS

| | | |
|---|---|---|
| 2,224,127 | Hansen | Dec. 10, 1940 |
| 2,500,043 | Radtke | Mar. 7, 1950 |
| 2,863,576 | Trask | Dec. 9, 1958 |